(12) United States Patent
    Crawford

(10) Patent No.: US 11,059,166 B2
(45) Date of Patent: Jul. 13, 2021

(54) LINEAR DELTA SYSTEMS WITH ADDITIONAL DEGREES OF FREEDOM AND RELATED METHODS

(71) Applicant: Battelle Energy Alliance, LLC, Idaho Falls, ID (US)

(72) Inventor: Anthony L. Crawford, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 250 days.

(21) Appl. No.: 16/191,047

(22) Filed: Nov. 14, 2018

(65) Prior Publication Data

US 2020/0147783 A1    May 14, 2020

(51) Int. Cl.
    B25J 9/00     (2006.01)
    B25J 17/02    (2006.01)
    B25J 9/10     (2006.01)

(52) U.S. Cl.
    CPC ........... *B25J 9/0051* (2013.01); *B25J 9/0009* (2013.01); *B25J 9/0039* (2013.01); *B25J 9/102* (2013.01); *B25J 17/0275* (2013.01)

(58) Field of Classification Search
    CPC ......... B23Q 1/25; B25J 9/0051; B25J 9/0009; B25J 9/0039; B25J 9/102; B25J 17/0275
    See application file for complete search history.

(56) References Cited

U.S. PATENT DOCUMENTS

| 4,652,204 A | 3/1987 | Arnett |
| 5,378,282 A | 1/1995 | Pollard |
| 6,047,610 A | 4/2000 | Stocco et al. |
| 6,099,217 A | 8/2000 | Wiegand et al. |
| 6,497,548 B1 | 12/2002 | Roy et al. |
| 6,516,681 B1 | 2/2003 | Pierrot et al. |
| 6,974,297 B2 | 12/2005 | Brogardh |
| 6,979,932 B2 | 12/2005 | Hamann et al. |
| 7,124,660 B2 | 10/2006 | Chiang |
| 7,331,750 B2 | 2/2008 | Merz et al. |

(Continued)

FOREIGN PATENT DOCUMENTS

| CN | 106737600 A | 5/2017 |
| CN | 107009350 A | 8/2017 |

(Continued)

OTHER PUBLICATIONS

International Search Report for Application No. PCT/US19/61222, dated May 7, 2020, 4 pages.

(Continued)

*Primary Examiner* — Zakaria Elahmadi
(74) *Attorney, Agent, or Firm* — TraskBritt

(57) ABSTRACT

A linear delta system includes a frame, rails secured to the frame, linear actuators, each linear actuator coupled to a respective rail and configured to translate along a longitudinal length of the respective rail, pairs of parallel rods each operably coupled to a respective linear actuator, a platform coupled to the pairs of parallel rods, structure configured to movable couple an object to the platform; and at least one degree of freedom imparting assembly including a profiled rod extending in a direction parallel to the rails and a drive unit configured to rotate the profiled rod, wherein the at least one degree of freedom imparting assembly is configured to impart a degree of freedom to the object.

10 Claims, 13 Drawing Sheets

(56) References Cited

U.S. PATENT DOCUMENTS

| | | | |
|---|---|---|---|
| 8,839,690 B2* | 9/2014 | Huang | B25J 17/0266 74/490.06 |
| 9,566,708 B2 | 2/2017 | Kurnianto | |
| 10,071,478 B2* | 9/2018 | Houston | B25J 9/0042 |
| 2004/0028516 A1 | 2/2004 | Brogardh | |
| 2004/0037663 A1 | 2/2004 | Zarske | |
| 2004/0052628 A1 | 3/2004 | Thurneysen et al. | |
| 2010/0263471 A1 | 10/2010 | Weber | |
| 2011/0097184 A1 | 4/2011 | Kinoshita et al. | |
| 2011/0120253 A1 | 5/2011 | Tara et al. | |
| 2011/0154936 A1 | 6/2011 | Zhao et al. | |
| 2013/0017050 A1 | 1/2013 | Fukudome et al. | |
| 2014/0060234 A1* | 3/2014 | Uemura | B25J 11/00 74/490.05 |
| 2014/0083231 A1 | 3/2014 | Sutherland | |
| 2014/0150591 A1 | 6/2014 | Yang | |
| 2014/0331806 A1 | 11/2014 | Nagatsuka | |
| 2014/0338489 A1 | 11/2014 | Peng et al. | |
| 2014/0360306 A1 | 12/2014 | Mihara et al. | |
| 2015/0176754 A1 | 6/2015 | Houston et al. | |
| 2015/0343631 A1 | 12/2015 | Martinez-Esponda | |
| 2016/0096329 A1 | 4/2016 | Ko et al. | |
| 2016/0332296 A1* | 11/2016 | Kurnianto | B25J 9/0042 |
| 2017/0050278 A1* | 2/2017 | Jaster | B25J 9/1045 |
| 2017/0144379 A1* | 5/2017 | Sung | B29C 64/393 |
| 2017/0167659 A1* | 6/2017 | Hwang | F16M 13/022 |
| 2018/0085913 A1* | 3/2018 | Ilch | B25J 17/0266 |
| 2019/0061144 A1* | 2/2019 | Yamamoto | B25J 9/0012 |
| 2019/0118378 A1* | 4/2019 | Ludban | B25J 9/0009 |
| 2019/0210220 A1 | 7/2019 | Wu | |
| 2019/0275669 A1 | 9/2019 | Matsushita et al. | |
| 2019/0329429 A1 | 10/2019 | Yamamoto | |
| 2020/0147784 A1* | 5/2020 | Crawford | B25J 9/0042 |

FOREIGN PATENT DOCUMENTS

| | | |
|---|---|---|
| CN | 107486843 A | 12/2017 |
| CN | 108465803 A | 8/2018 |
| EP | 2821186 A3 | 5/2015 |
| JP | 2009-297793 A | 12/2009 |
| JP | 2006-082157 | 8/2012 |
| KR | 10-2014-0122493 A | 10/2014 |
| WO | 2015/115887 A1 | 8/2015 |

OTHER PUBLICATIONS

International Written Opinion for Application No. PCT/US19/61222, dated May 7, 2020, 8 pages.

Williams II, "The Delta Parallel Robert: Kinematics Solutions", Internet Publication, www.ohio.edu/people/williar4/html/pdf/DeltaKin.pdf, (Jan. 2016) 46 pages.

Stan et al., "Evolutionary Approach to Optimal Design of 3 DOF Translation Exoskeleton and Medical Parallel Robots", 2008 Conference on Human System Interactions, Krakow, Poland (May 2008) pp. 720-725.

Oberhauser, "Design, Construction, Control, and Analysis of Linear Delta Robot", thesis presented to the faculty of the Russ College of Engineering and Technology of Ohio University (Apr. 2016) 136 pages.

* cited by examiner

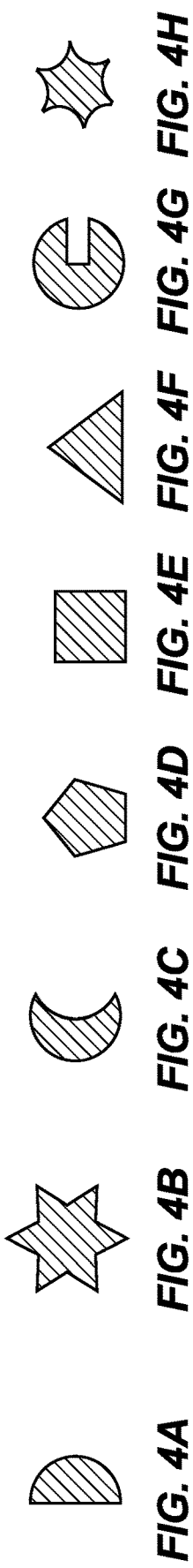

LINEAR DELTA SYSTEMS WITH ADDITIONAL DEGREES OF FREEDOM AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

CROSS-REFERENCE TO RELATED APPLICATIONS

The subject matter of application is related to the subject matter of U.S. patent application Ser. No. 16/191,135, filed Nov. 14, 2018, titled "LINEAR DELTA SYSTEMS, HEXAPOD SYSTEMS, AND RELATED METHODS" by inventor Anthony L. Crawford, and to the subject matter of U.S. patent application Ser. No. 16/191,093, filed Nov. 14, 2018, now U.S. Pat. No. 10,821,599, issued Nov. 3, 2020, titled "DUAL LINEAR DELTA ASSEMBLIES, LINEAR DELTA SYSTEMS, AND RELATED METHODS" by inventor Anthony L. Crawford, the disclosure of each of which is hereby incorporated herein in its entirety by this reference.

TECHNICAL FIELD

This disclosure relates generally to linear delta robots (e.g., systems) and related methods. In particular, this disclosure relates to linear delta robots having more than three degrees of freedom.

BACKGROUND

Delta robots (e.g., parallel robots) are utilized in many applications involving human-systems interaction, medical robots, rehabilitation, exoskeletons, radiological environments, nuclear fuel testing, etc. The foregoing applications typically require robust precision and dynamic workspace computation. Delta robots conventionally provide only three degrees of freedom and such limitations hinder the abilities and applications of the delta robots. Furthermore, when additional degrees of freedom are imparted conventionally to the delta robots via additional systems, the systems typically involve placing additional drive units (e.g., motors) and associated electronics and linkages on the load path (e.g., on a platform) of the delta robots or a telescopic link disposed between a platform and a base (typically at top of a robot cell). The foregoing mentioned elements increase the platform's mass and volume. The additional mass increases the system's inertia resulting in significantly increased motor requirements to achieve equivalent non-loaded platform speeds. The foregoing is highly impactful because delta systems are conventionally designed based on low platform inertia expectations. Additionally, increased volume results in increased cross sectional area which, similar to additional mass, has significant performance implications due to fluid drag which is highly impactful in underwater applications. For instance, in underwater applications and/or radiological environments, motor weight and volume payloads are greatly increased compared to air environment applications because the drive units (e.g., motors) and any electronics associated with the drive unit require additional shielding and sealing protection. Furthermore, the added drive units and associated electronics and linkages result in added water shear and drag when moving the platform and other objects. Moreover, linear delta robots are not typically capable of rapid translation of any significant distance in any one horizontal direction. Again, the foregoing issue severely limits the applications of delta robots. Additionally, delta robots are typically limited in their working space and conventionally are not mobile, by requiring significant framing to support and operate the delta robots.

BRIEF SUMMARY

Some embodiments of the present disclosure include a linear delta system. The linear delta system may include a frame, rails secured to the frame and oriented parallel to each other, linear actuators, each linear actuator coupled to a respective rail and configured to translate along a longitudinal length of the respective rail, pairs of parallel rods each operably coupled to a respective linear actuator, a platform coupled to a longitudinal end of each of the pairs of parallel rods opposite the respective linear actuator, structure configured for movably coupling an object to the platform, and at least one degree of freedom imparting assembly. The at least one degree of freedom imparting assembly may include a profiled rod extending in a direction parallel to the rails, and a drive unit configured to rotate the profiled rod and disposed on the frame of the linear delta system, wherein the at least one degree of freedom imparting assembly is configured to impart a degree of freedom to the object.

One or more embodiments of the present disclosure include a linear delta system. The linear delta system may include a frame, rails secured to the frame and oriented parallel to each other, linear actuators, each linear actuator coupled to a respective rail and configured to translate along a longitudinal length of the respective rail, pairs of parallel rods each operably coupled to a respective linear actuator, a platform coupled to a longitudinal end of each of the pairs of parallel rods opposite the respective linear actuator, a probe assembly movably coupled to the platform, and at least one degree of freedom imparting assembly engaged with the probe assembly and configured to impart a degree of freedom to the probe assembly. The probe assembly may include an upper plate disposed above the platform, a translating plate disposed between the upper plate and the platform, drive rods vertically fixed at the upper plate and operably coupled to the translating plate, a plurality of structure rods secured to the upper plate, extending through the translating plate, and secured to the platform, and a probe secured to a bottom surface of the translating plate and extending through the platform.

Some embodiments of the present disclosure include a method of depositing a probe within a granular material. The method may include causing at least one linear actuator to translate back and forth along a lead screw according to a first wave motion, causing a probe assembly secured to a platform coupled to the at least one linear actuator to translate back and forth in a same direction as the at least one linear actuator and according to a second counter wave motion, and vibrating both the at least one linear actuator and probe assembly.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein:

FIGS. 4A-4H show various example cross-sectional profiles of a profiled rod of a degree of freedom imparting assembly according to embodiments of the present disclosure;

DETAILED DESCRIPTION

Figure 1:
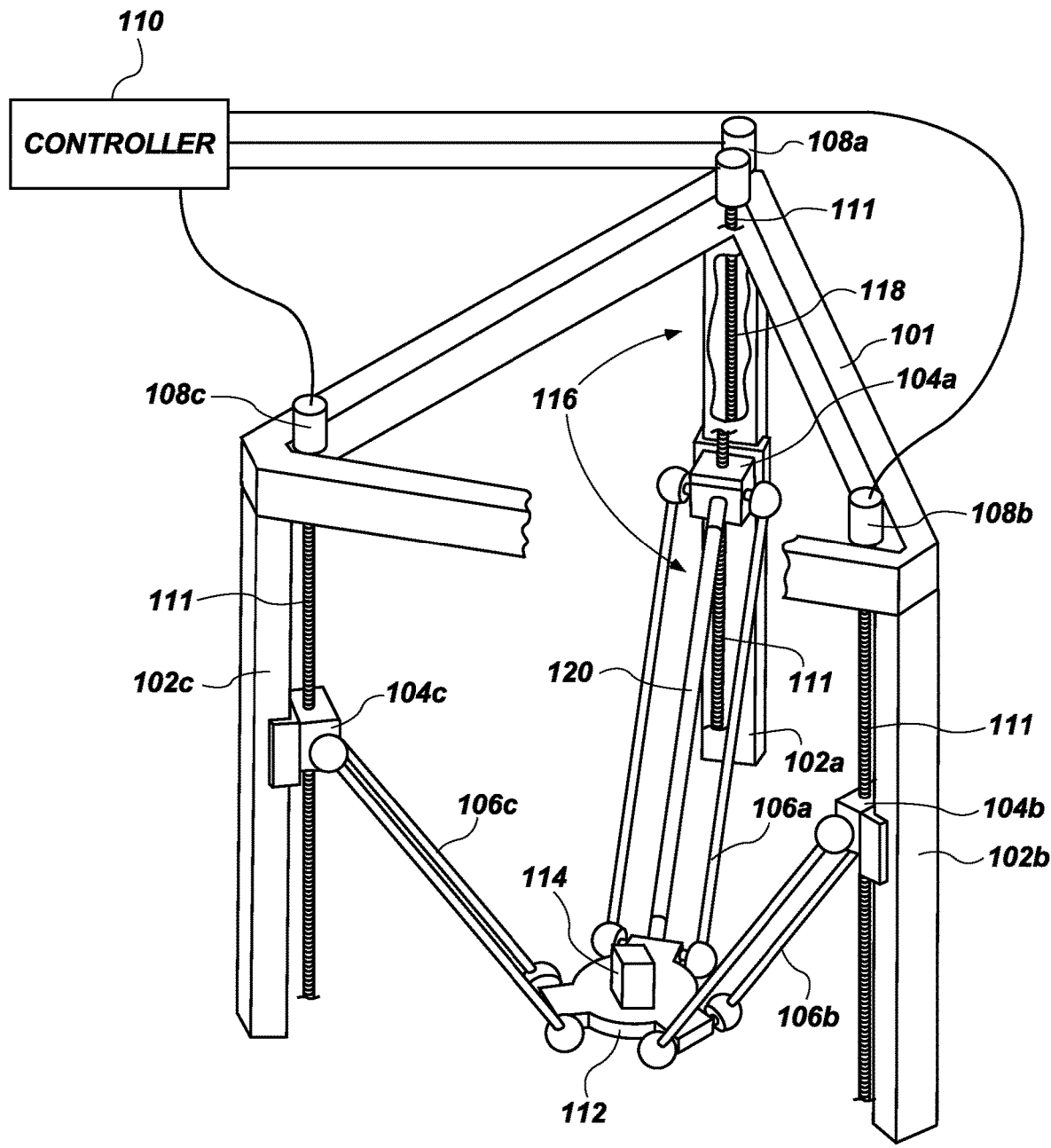
FIG. 1 is a perspective view of a linear delta system according to one or more embodiments of the present disclosure.

The illustrations presented herein are not actual views of any linear delta system or any component thereof, but are merely idealized representations, which are employed to describe the present invention.

As used herein, any relational term, such as "first," "second," "top," "bottom," "upper," "lower," "side," etc., is used for clarity and convenience in understanding the disclosure and accompanying drawings, and does not connote or depend on any specific preference or order, except where the context clearly indicates otherwise. For example, these terms may refer to an orientation of elements of a linear delta system when utilized in a conventional manner. Furthermore, these terms may refer to an orientation of elements of a linear delta system when as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

FIG. 1 shows a schematic linear delta system 100 (i.e., a linear delta robot) according to one or more embodiments of the present disclosure. Some portions of the linear delta system 100 are removed to better show the structure of the linear delta system 100. Similar to conventional linear delta systems, the linear delta system 100 may include a stationary frame 101, three rails 102a, 102b, 102c, three linear actuators 104a, 104b, 104c (e.g., carriages), three pairs of parallel rods 106a, 106b, 106c, three drive units 108a, 108b, 108c, a controller 110, a platform 112, and an object 114 of interest (e.g., an object to be manipulated).

Each linear actuator (e.g., linear actuator 104a) may be movably coupled to a respective rail (e.g., rail 102a) of the three rails 102a, 102b, 102c (referred to collectively with the reference numeral 102) in conventional manners, and the three rails 102 may each face a common center axis and may be oriented about 120° apart from each other. In some embodiments, longitudinal axes of the rails 102 may be oriented parallel to each other. In other embodiments, the longitudinal axes of the rails 102 may be oriented about 120° apart about a center longitudinal axis of the linear delta system 100 and may intersect a common axis that, in some embodiments, is the center longitudinal axis. Furthermore each linear actuator 104 may be configured to translate along (e.g., back and forth along, up and down along, etc.) a longitudinal length of a respective rail 102. In some embodiments, the movement (e.g., translation) of the linear actuators 104a, 104b, 104c (referred to herein collectively with the reference numeral 104) may be controlled and operated by the three drive units 108a, 108b, 108c (referred to collectively with the reference numeral 108) and the controller 110 via conventional manners. For example, in one or more embodiments, the three drive units 108 may each include a motor (e.g., electric motor) operably coupled to the controller 110 and a lead screw 111 to which a respective linear actuator 104 is coupled. The motor may rotate the lead screw which, in turn, causes the linear actuator 104 to translate up or down along the lead screw. In further embodiments, each drive unit 108 may include gears and/or pulleys for extending and retracting chains and/or timing belts attached to a respective linear actuator 104. For instance, the drive units 108, rails 102, and linear actuators 104 may include any conventional linear delta robots known in the art.

The three pairs of parallel rods 106a, 106b, 106c (referred to herein collectively with the reference numeral 106) may extend between a respective linear actuator 104 and the platform 112. In some embodiments, each rod 106 of each pair of parallel rods 106 may be connected on longitudinal ends thereof to a respective linear actuator 104 and the platform 112 via spherical or universal joints. As is known in the art, the rods 106 within the pairs of parallel rods 106 may remain parallel to each other and may define portions of a parallelogram during operation of the linear delta system 100 and movement of the platform 112. Furthermore, as is known in the art, by moving the linear actuators 104, either independently or simultaneously, along the three rails 102 (e.g., up and down), the platform 112 may be moved within three degrees of freedom. In particular, the linear actuators 104 and platform 112 may be operated via any conventional methods.

In one or more embodiments, the object 114 may be movably coupled to the platform 112. In particular, the object 114 may be movable relative to the platform 112. In some embodiments, the object 114 may be movable relative to the platform 112 in one, two, three, or more additional degrees of freedom. For example, the object 114 may be coupled to the platform 112 via a single axis or multi-axis (e.g., three-axis) gimbal or any other movable joint or connection. In one or more embodiments, the object 114 may include an object to be manipulated (e.g., moved and/or placed) via the linear delta system 100. For instance, the object 114 may include a nuclear fuel rod, fiber optic cable, radioactive material, etc. In additional embodiments, the object 114 may include a camera, a probe (e.g., a channel gab probe), a scanner (e.g., a flat plate scanner), and/or a sensor for imaging and/or testing procedures. In additional embodiments, the object 114 may include additional elements such as, for example, a gripper, a magnet, a bucket, a shovel, a rake, a gimbal, a quick-attach device, a force and/or torque sensor, a handle, other material handling devices, etc.

Referring still to FIG. 1, the linear delta system 100 may further include one or more degree of freedom imparting assemblies 116 (referred to herein individually as a DOF assembly 116). Each DOF assembly 116 may include a profiled rod 118, a connection rod 120, and operable couplings (described below) between the profiled rod 118, connection rod 120, and platform 112. The profiled rod 118 may extend through either a respective rail 102 or a linear actuator 104 and may extend longitudinally in a direction that is parallel to the longitudinal axis of the respective rail 102, and the connection rod 120 may be operably coupled to the profiled rod 118 and may extend between the linear actuator 104 and the platform 112 and object 114. The profiled rod 118 may have a cross-sectional profile (e.g., outer peripheral surface) that enables the profiled rod 118 to impart rotational motion of the profiled rod 118 to other members. The DOF assembly 116 is described in greater detail below in regard to FIGS. 2 and 3. Furthermore, although the DOF assembly 116 is described herein in conjunction with a linear delta system, the DOF assembly 116 is applicable to any parallel robot employing linear actuators regardless of whether the linear actuators are parallel to each other.

The controller 110 may be configured to operate the linear delta system 100 and the DOF assemblies 116. Furthermore, the controller 110 may be configured to provide graphical data to a display for presentation to the operator. The graphical data may be representative of one or more graphical user interfaces and/or any other graphical content as may serve a particular implementation. Furthermore, although the controller 110 is described herein as being part of the linear delta system 100, the disclosure is not so limited; rather, as will be understood by one of ordinary skill in the art, the controller 110 may be discrete from the linear delta system 100 and may be remote to the linear delta system 100. The controller 110 is described in greater detail below with reference to FIG. 8.

Figure 2:
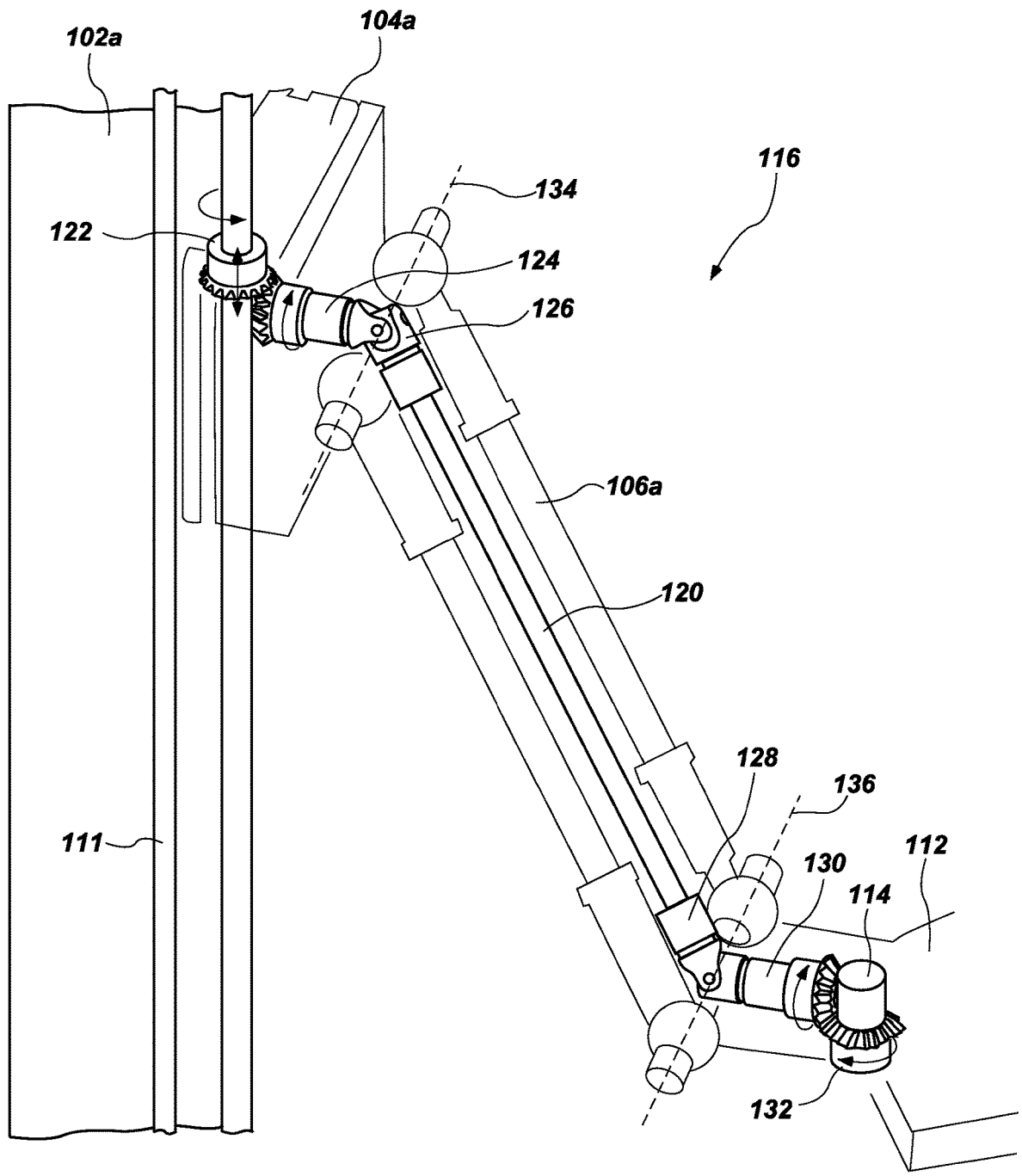
FIG. 2 is a perspective view of a degree of freedom imparting assembly of a linear delta system according to one or more embodiments of the present disclosure.
Figure 3:
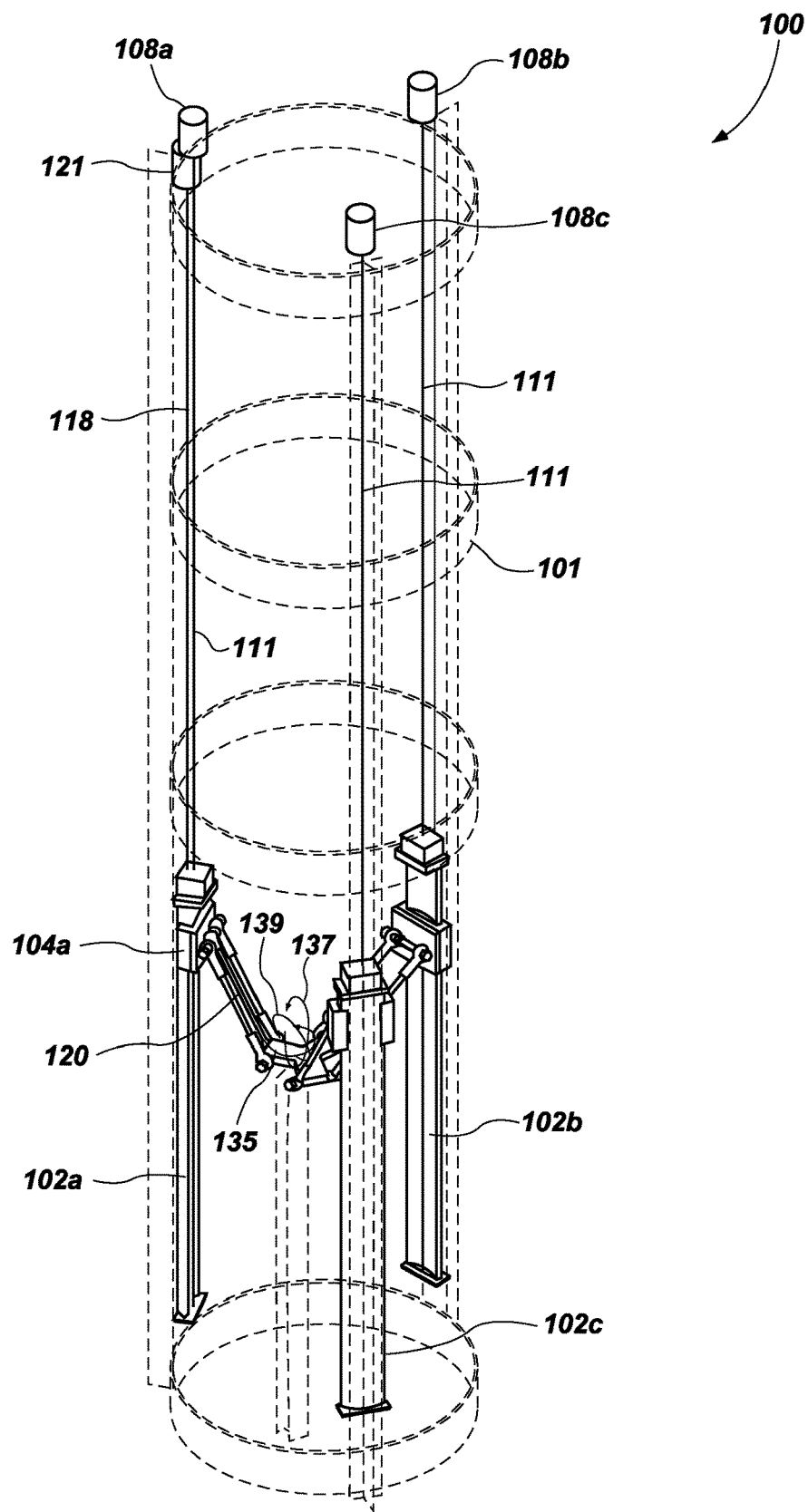
FIG. 3 is a perspective view of a linear delta system according to one or more embodiments of the present disclosure.

FIG. 2 is a perspective view of a DOF assembly 116 coupled with a respective rail 102a, a respective linear actuator 104a, and the platform 112 according to one or more embodiments of the present disclosure. FIG. 3 is a perspective view of the linear delta system 100 of FIG. 1. Referring to FIGS. 2 and 3 together, in some embodiments, the DOF assembly 116 may further include a drive unit 121, a slidable-engagement member 122, a first receiving-engagement member 124, a first joint assembly 126, a second joint assembly 128, an imparting-engagement member 130, and, in one or more embodiments, a second receiving-engagement member 132.

The drive unit 121 may be operably coupled to the profiled rod 118 and may be configured to rotate the profiled rod 118 about a longitudinal axis of the profiled rod 118. In some embodiments, the drive unit 121 may include an electric motor. The slidable-engagement member 122 may include an aperture having a profile correlating to the cross-sectional profile of the profiled rod 118, and the profiled rod 118 may extend through the aperture of the slidable-engagement member 122. In one or more embodiments, the slidable-engagement member 122 may have an outer profile complementing the profiled rod 118 (e.g., two spur gears), and the slidable-engagement member 122 may slide (e.g., translate) on the outside of the profiled rod 118, rather than having the profiled rod 118 extend through an aperture of the slidable-engagement member 122. As a result, when the profiled rod 118 is rotated, the slidable-engagement member 122 may be rotated as well. The slidable-engagement member 122 may translate along the profiled rod 118 with the respective linear actuator 104a. For example, the slidable-engagement member 122 may be disposed at least partially within the linear actuator 104a and/or may be secured to the linear actuator 104a. In some embodiments, the slidable-engagement member 122 may include a gear, a sprocket, a sprocket and chain assembly, a beveled gear, or a pulley and belt assembly.

The first receiving-engagement member 124 may be engageable (e.g., engaged) with the slidable-engagement member 122 and may be configured to receive and transfer motion from the slidable-engagement member 122. For example, the first receiving-engagement member 124 may be configured to transfer motion from the slidable-engagement member 122 to the first joint assembly 126. In some embodiments, the first receiving-engagement member 124 may be at least partially disposed within the linear actuator 104a. In some embodiments, the first receiving-engagement member 124 may include a gear, a sprocket, a sprocket and chain assembly, a beveled gear, or a pulley and belt assembly. For instance, in some embodiments, the slidable-engagement member 122 and the first receiving-engagement member 124 may share a common chain and/or belt. In embodiments where the slidable-engagement member 122 and the first receiving-engagement member 124 each comprise a beveled gear (e.g., a 45° beveled gear) (as depicted in FIG. 2), the rotational axes of the beveled gears may be perpendicular to each other.

The first joint assembly 126 may be connected to the first receiving-engagement member 124 and the connection rod 120. For example, the first joint assembly 126 may be disposed between the first receiving-engagement member 124 and the connection rod 120. Furthermore, the first joint assembly 126 may be configured to transfer motion from the first receiving-engagement member 124 to the connection rod 120 even when the longitudinal axes of the first receiving-engagement member 124 and the connection rod 120 define an acute angle therebetween (e.g., when the longitudinal axes of the first receiving-engagement member 124 and the connection rod 120 are not perpendicular to each other or parallel to each other). For example, the first joint assembly 126 may include a universal coupling, a U-joint, a Cardan joint, a Spicer or Hardy Spicer joint, or a Hooke's joint. For example, the first joint assembly 126 may include two yoked ends (e.g., a yoked end attached to each of the first receiving-engagement member 124 and the connection rod 120) and a cross member disposed between the two yoked ends and coupled to the two yoked ends via needle bearings.

In some embodiments, the first joint assembly 126 and the spherical or universal joints disposed on upper ends of the respective pair of parallel rods 106a may share a common horizontal axis 134 (e.g., a first horizontal axis 134). In other words, a common horizontal axis 134 may extend through a center of each of the spherical or universal joints disposed on upper ends of the respective pair of parallel rods 106a and the first joint assembly 126. Sharing a common horizontal axes in the manners described above removes any need to include an additional translational degree of freedom to the connection rod 120. If, on the other hand, the first joint assembly 126 and the spherical or universal joints disposed on upper ends of the respective pair of parallel rods 106a do not share a common horizontal axis 134, a connection rod enabled with a typical telescoping profiled rod, or equivalent, would be necessary to impart an additional degree of freedom to the object 114.

The connection rod 120 may extend from the first joint assembly 126 to the second joint assembly 128. Furthermore, in some embodiments, the connection rod 120 may be at least substantially parallel to the rods of the respective pair of parallel rods 106a. The second joint assembly 128 may be connected to the connection rod 120 and the imparting-engagement member 130. For example, the second joint assembly 128 may be disposed between the connection rod 120 and the imparting-engagement member 130. Furthermore, the second joint assembly 128 may be configured to transfer motion from the connection rod 120 to the imparting-engagement member 130 even when the longitudinal axes of the connection rod 120 and the imparting-engagement member 130 define an acute angle therebetween. For example, the second joint assembly 128 may include any of the joints described above in regard to the first joint assembly 126. In some embodiments, the second joint assembly 128 and the spherical or universal joints disposed on lowers ends of the respective pair of parallel rods 106a may share a common horizontal axis 136 (e.g., a second horizontal axis 136). In other words, a common horizontal axis 136 may extend through a center of each of the spherical or universal joints disposed on lower ends of the respective pair of parallel rods 106a and the second joint assembly 128.

The imparting-engagement member 130 may be engageable (e.g., engaged) with the second receiving-engagement member 132. In one or more embodiments, the imparting-engagement member 130 may be disposed at least partially within the platform 112. In alternative embodiments, the imparting-engagement member 130 may be disposed above, below, or to a side of the platform 112. In some embodiments, the imparting-engagement member 130 may include a gear, a sprocket, a sprocket and chain assembly, a beveled gear, or a pulley and belt assembly.

The second receiving-engagement member 132 may be configured to receive and transfer motion from the imparting-engagement member 130. For example, the second receiving-engagement member 132 may be configured to transfer motion from the imparting-engagement member 130 to the object 114, which may be coupled to the second receiving-engagement member 132. In some embodiments, the second receiving-engagement member 132 may be at least partially disposed within the platform 112. In some embodiments, the second receiving-engagement member 132 may include a gear, a sprocket, a sprocket and chain assembly, a beveled gear, or a pulley and belt assembly. For instance, in some embodiments, the imparting-engagement member 130 and the second receiving-engagement member 132 may share a common chain and/or belt. In embodiments where the imparting-engagement member 130 and the second receiving-engagement member 132 each comprise a beveled gear (as depicted in FIG. 2), the rotational axes of the beveled gears may be perpendicular to each other. Accordingly, causing the imparting-engagement member 130 to move (e.g., rotate) causes the second receiving-engagement member 132 to move (e.g., rotate).

As mentioned above, the second receiving-engagement member 132 may be coupled to the object 114. As a result, causing the second receiving-engagement member 132 to move (e.g., rotate) may impart a degree of freedom to the object 114 (i.e., create a direction in which independent motion can be achieved by the object 114). In view of the foregoing, the DOF assembly 116 may impart a degree of freedom to the object 114 (i.e., a degree of freedom beyond the degrees of freedom imparted by a conventional linear delta system). For instance, the DOF assembly 116 may enable the object 114 to rotate about an axis or to translate along an axis. Furthermore, in some embodiments, the linear delta system 100 may include zero, one, two, three, or more DOF assemblies. For instance, the linear delta system 100 may include a DOF assembly associated with each rail 102 and linear actuator 104 of the linear delta system 100. Accordingly, the three DOF assemblies may impart three degrees of freedom to the object 114 beyond that of a conventional linear delta system. The added degrees of freedom are schematically represented by the three arrows 135, 137, and 139 in FIG. 3. In particular, in some embodiments, the degrees of freedom may include rotation about and/or translation along two perpendicular horizontal axes (e.g., an X-axis and a Y-axis) and a vertical axis (e.g., a Z-axis).

Referring still to FIGS. 2 and 3 together, although the DOF assembly 116 is depicted as including beveled gears and a connection rod 120, the disclosure is not so limited. Rather, the DOF assembly 116 may include any combination of gears, rods, sprockets, chains, or belts to impart a degree of freedom to the object 114. Additional embodiments of the DOF assembly 116 are described in further detail below in regard to FIGS. 5A-5E.

Referring to FIGS. 1-3 together, the linear delta system 100 and the DOF assembly 116 may provide advantages over conventional linear delta systems. For example, utilizing three DOF assemblies adds three degrees of freedom to an object 114 to be manipulated in comparison to conventional linear delta systems. As a result, when probing or scanning another object, the linear delta system 100 may be able to more accurately probe and/or scan the another object utilizing the three additional degrees of freedom even when the another object has a complex (e.g., contorted) shape.

Furthermore, even in comparison to conventional linear delta systems that include electronics/motors on the platform 112 that add degrees of freedom at the platform 112, the linear delta system 100 and the DOF assembly 116 of the present disclosure utilize drive units (e.g., electric motors) that are disposed at the stationary frame 101 proximate a top of the linear delta system 100 (i.e., distal to the platform 112). As a result, the drive units 108 of linear delta system 100 and the DOF assembly 116 are protected and separated from any harsh environments experienced by the platform 112 and the object 114. For instance, in nuclear applications (e.g., manipulating radioactive materials, testing radioactive materials, performing tests underwater, etc.) presenting harsh environments, the linear delta system 100 and the DOF assembly 116 protect the crucial electronics (e.g., drive units) needed to operate the linear delta system 100 and the DOF assembly 116 from the harsh environments without requiring excessive shielding or protection (e.g., sealing and/or tethering) disposed on the platform 112. As a result, the platform 112 and overall linear delta system 100 may be lighter in comparison to shielded linear delta systems, which enables faster and more accurate movement of the linear delta system 100. Moreover, by avoiding additional shielding and/or protection, which often interfere with working space, the DOF assembly 116 described herein avoids interfering with a working space. Furthermore, even if the drive units 108 of the linear delta system 100 and the DOF assembly 116 require shielding for a particular application, the shielding (i.e., the weight of the shielding) is not added to the platform 112, linear actuators 104, and/or pairs of parallel rods 106. Rather, the shielding is added at the drive units 108 which are secured to the stationary frame 101 at a top of the linear delta system 100. Thus, the linear delta system 100 and the DOF assembly 116 do not add to the mass of the platform 112 or inertia during movement along the load path of the linear delta system 100 and the DOF assembly 116. Again, by not adding mass to the platform 112 or increasing inertia during movement along the load path, the linear delta system 100 and the DOF assembly 116 provide improved speed and accuracy in comparison to conventional linear delta system. As a result of the foregoing, linear delta system 100 and the DOF assembly 116 may provide relatively fast and accurate movements with smaller drive units 108 in comparison to conventional systems. Accordingly, the linear delta system 100 and the DOF assembly 116 may provide cost savings.

Moreover, the linear delta system 100 and the DOF assembly 116 are advantageous because the object's 114 displacement is not constrained by any physical tethering cord or telescoping shaft between the platform 112 and a base of the linear delta system 100 (typically at a top of a cell), which are typically employed to impart additional degrees of freedom to an object within a conventional linear delta system. Furthermore, in underwater applications, the linear delta system 100 and the DOF assembly 116 may experience less water shear, drag, and turbulence in comparison to conventional linear delta systems when operating a sensor. Moreover, as is known in the art, water shear, drag, and turbulence can effect sensor data at relatively high speeds. As a result, the linear delta system 100 and the DOF assembly 116 may provide more accurate sensor data in a faster manner in comparison to conventional linear delta systems.

FIGS. 4A-4H show various cross-sectional profiles 402a-402h of the profiled rod 118 according to embodiments of the present disclosure. As shown in FIGS. 4A-4F, in some embodiments, the cross-sectional profiles 402a-402h of the profiled rod 118 may include a general D-shape, a general sprocket-shape or gear-shape, a general moon-shape, a pentagon-shape or an octagon-shape, a rectangle or square-shape, or a triangle-shape. Furthermore, as shown in FIG. 4G, the profile 402g may include a general cylindrical shape having a notch 404 (e.g., recess) formed therein. Additionally, in one or more embodiments, the profile 402h may include a general Torx key-shape. For instance, the profile 402h may include a number of peaks 406 extending outward radially from a center longitudinal axis 408 of the profiled rod 118 separated by concave valleys 410. Moreover, while particular profiled shapes are described herein, the disclosure is not so limited, and rather, the profile of the profiled rod 118 may include any geometric shape that would cause the slidable-engagement member 122 to rotate via mechanical interference between the surfaces defining the profiled aperture extending through the slidable-engagement member 122 and the profiled rod 118 or any equivalent engagement between the external surfaces of the slidable-engagement member 122 and the profiled rod 118 that would cause the slidable-engagement member 122 to rotate via mechanical interference.

FIGS. 5A-5F illustrate a linear delta system 500 having two DOF assemblies 516a, 516b implemented therein to add two additional degrees of freedom to an object 514 coupled to a platform 512. Referring to FIGS. 5A-5F together, similar to the DOF assembly 116 described above in regard to FIGS. 1-3, each of the DOF assemblies 516a, 516b include a drive unit 121 (FIG. 1), a slidable-engagement member 122 (FIG. 1), a first receiving-engagement member 124 (FIG. 1), a first joint assembly 126 (FIG. 1), a rod 527a, 527b, a second joint assembly 528a, 528b, an imparting-engagement member 530a, 530b, and a second receiving-engagement member 532a, 532b.

The object 514 may include a probe assembly 540 coupled to the platform 512. The probe assembly 540 may include an upper plate 542, a translating plate 544, a plurality of drive rods 546, a plurality of structure rods 548, and a probe 550 (e.g., a channel gap probe). The plurality of structure rods 548 may be secured to the upper plate 542, may extend from the upper plate 542 and through the translating plate 544, and may be secured to the platform 512. The translating plate 544 may be slidable along the plurality of structure rods 548. The plurality of drive rods 546 may be coupled to the translating plate 544 and may be configured to cause the translating plate 544 to translate along the longitudinal lengths of (e.g., up and down) the plurality of drive rods 546 by rotating. For instance, the plurality of drive rods 546 may include a plurality of threaded rods and the translating plate 544 may include plurality of correlating threaded holes.

In some embodiments, the platform 512 may include an outer frame 552 defining a circular aperture extending from an upper surface to a lower surface thereof and centered on a longitudinal axis thereof. The platform 512 may further include a circular plate 555 disposed within the circular aperture. The circular plate 555 may be free to rotate with the circular aperture of the platform 512. In some embodiments, the plurality of drive rods 546 may be fixed vertically to the upper plate 542 but may be free to rotate relative to the upper plate 542 and the platform 512. Moreover, as is discussed in further detail below, in some embodiments, the entire probe assembly 540 is configured to rotate about a center longitudinal axis 556 of the probe assembly 540 on the circular plate 555.

The probe 550 may be secured to the translating plate 544 (e.g., to a bottom surface of the translating plate 544) and may extend through an aperture in the platform 512. As a result, as the translating plate 544 translates up and down, the probe 550 also translates up and down.

Referring in particular to FIGS. 5C-5F, in some embodiments, the imparting-engagement members 530a, 530b of the DOF assemblies 516a, 516b may each include a gear 552a, 552b disposed on the longitudinal end of a post member 554a, 554b. In one or more embodiments, the gear 552a, 552b may be oriented to rotate about an axis that is parallel to the center longitudinal axis 556 of the probe assembly 540.

Figure 5A:
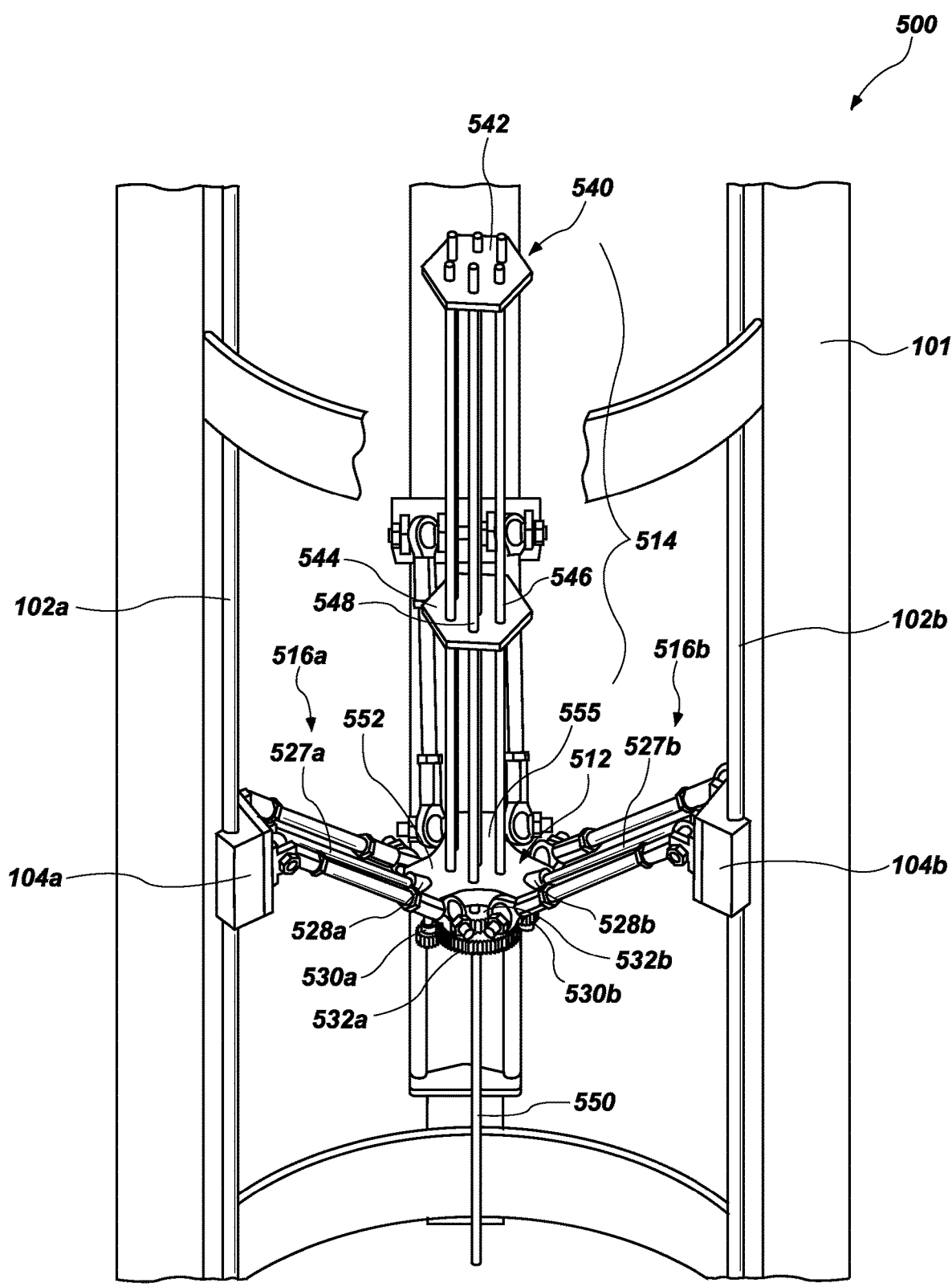
FIGS. 5A-5F illustrate a linear delta system having two degree of freedom imparting assemblies according to one or more embodiments of the present disclosure.
Figure 5B:
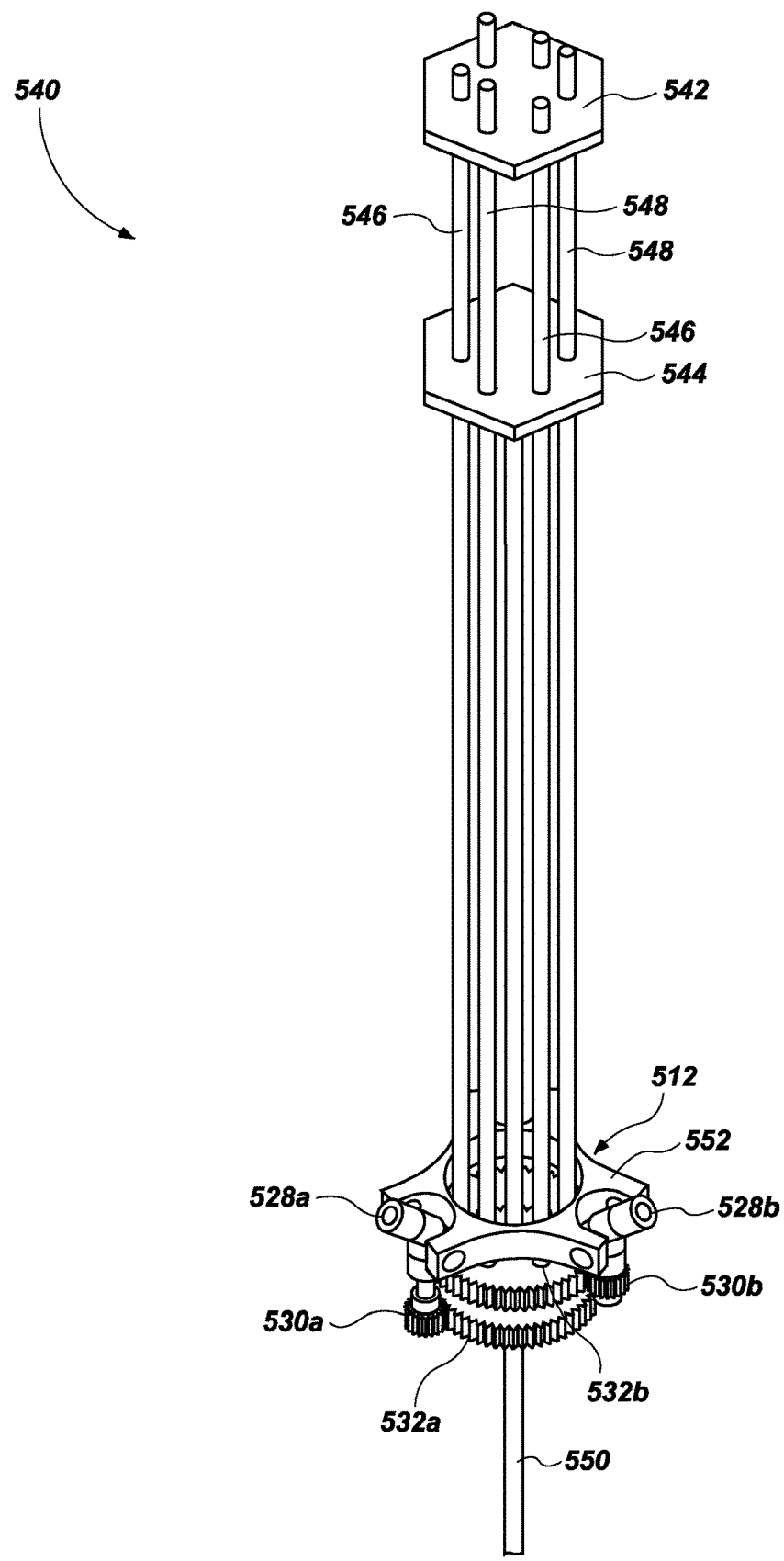
Figure 5C:
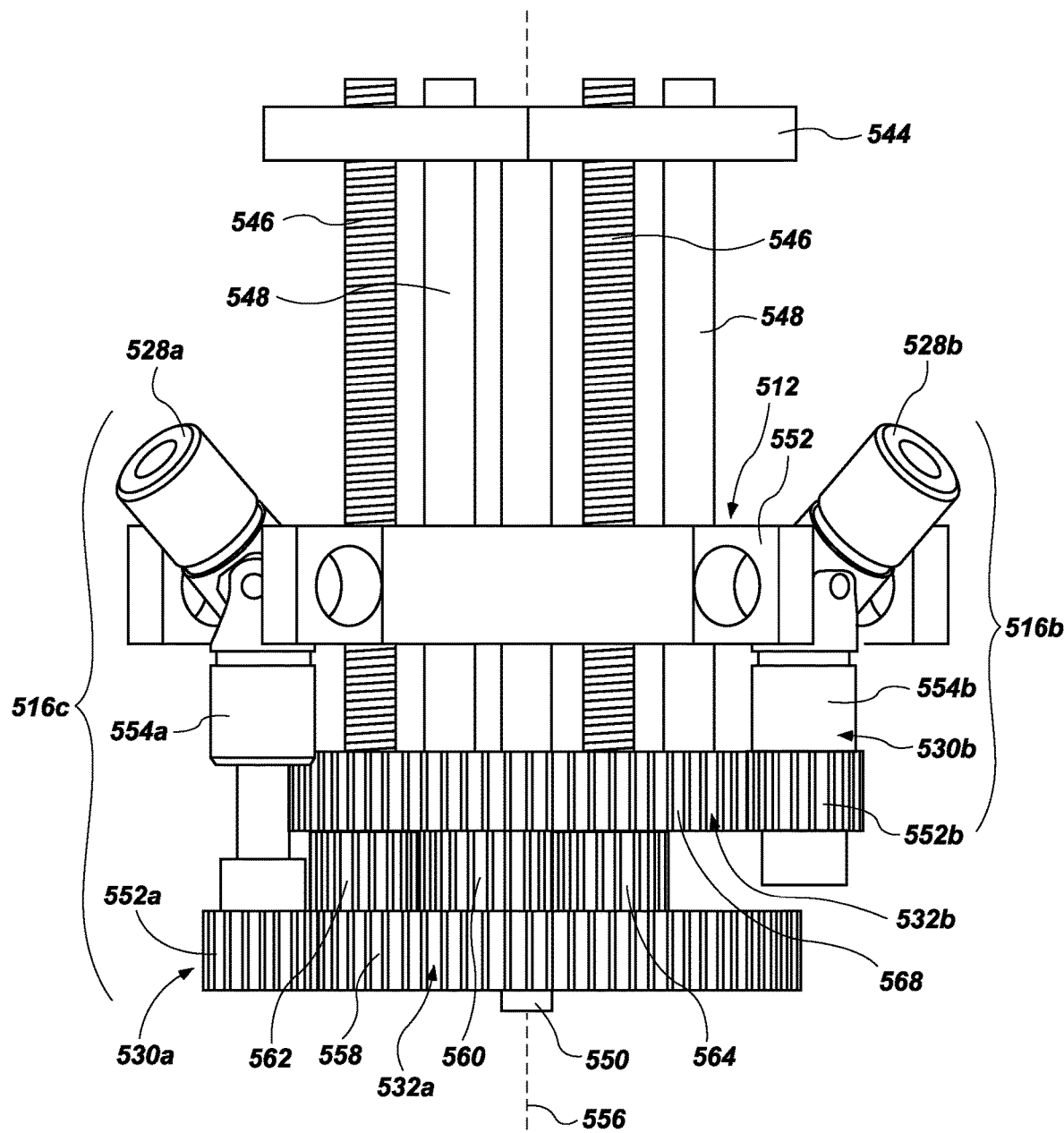
Figure 5D:
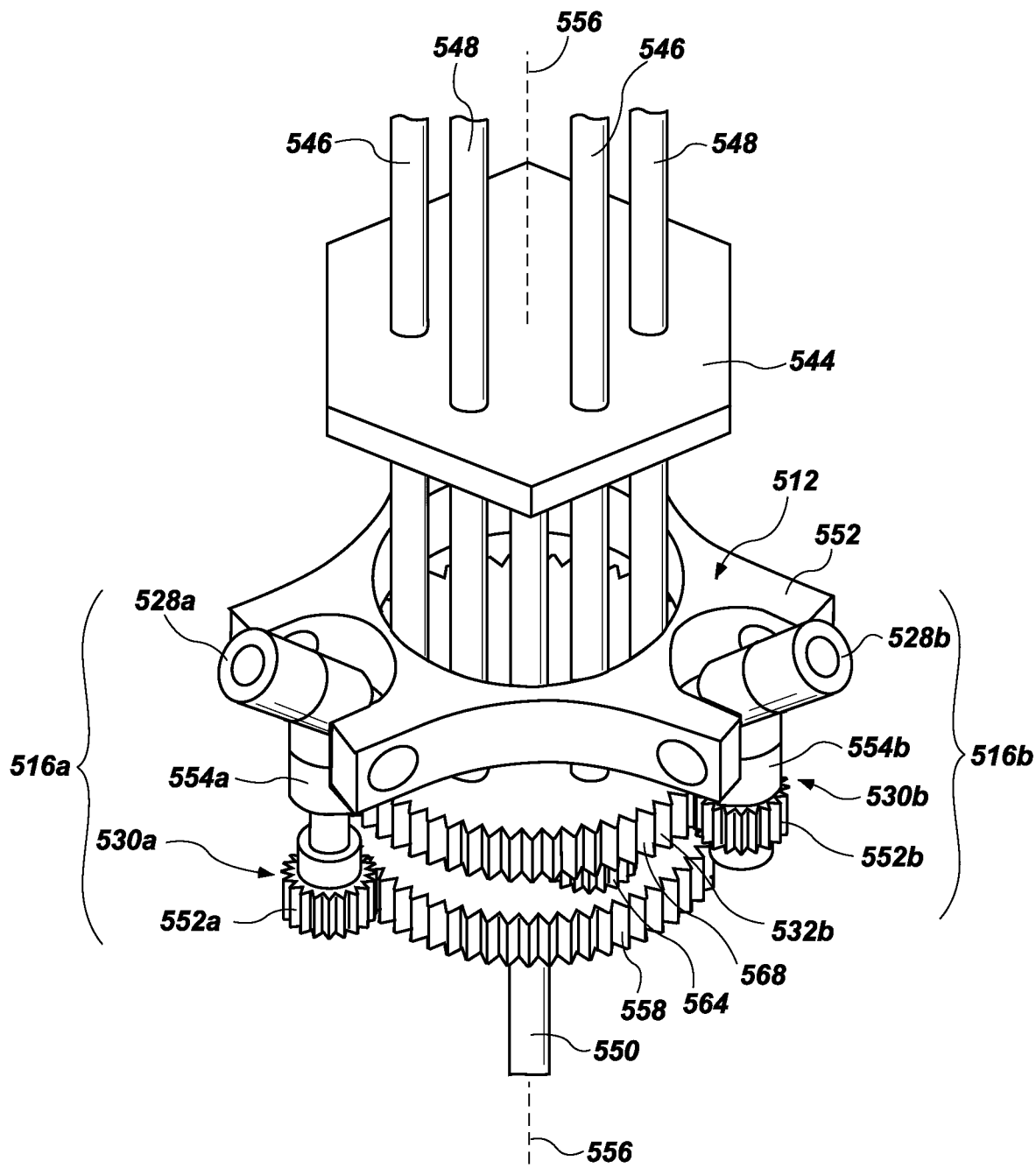
Figure 5E:
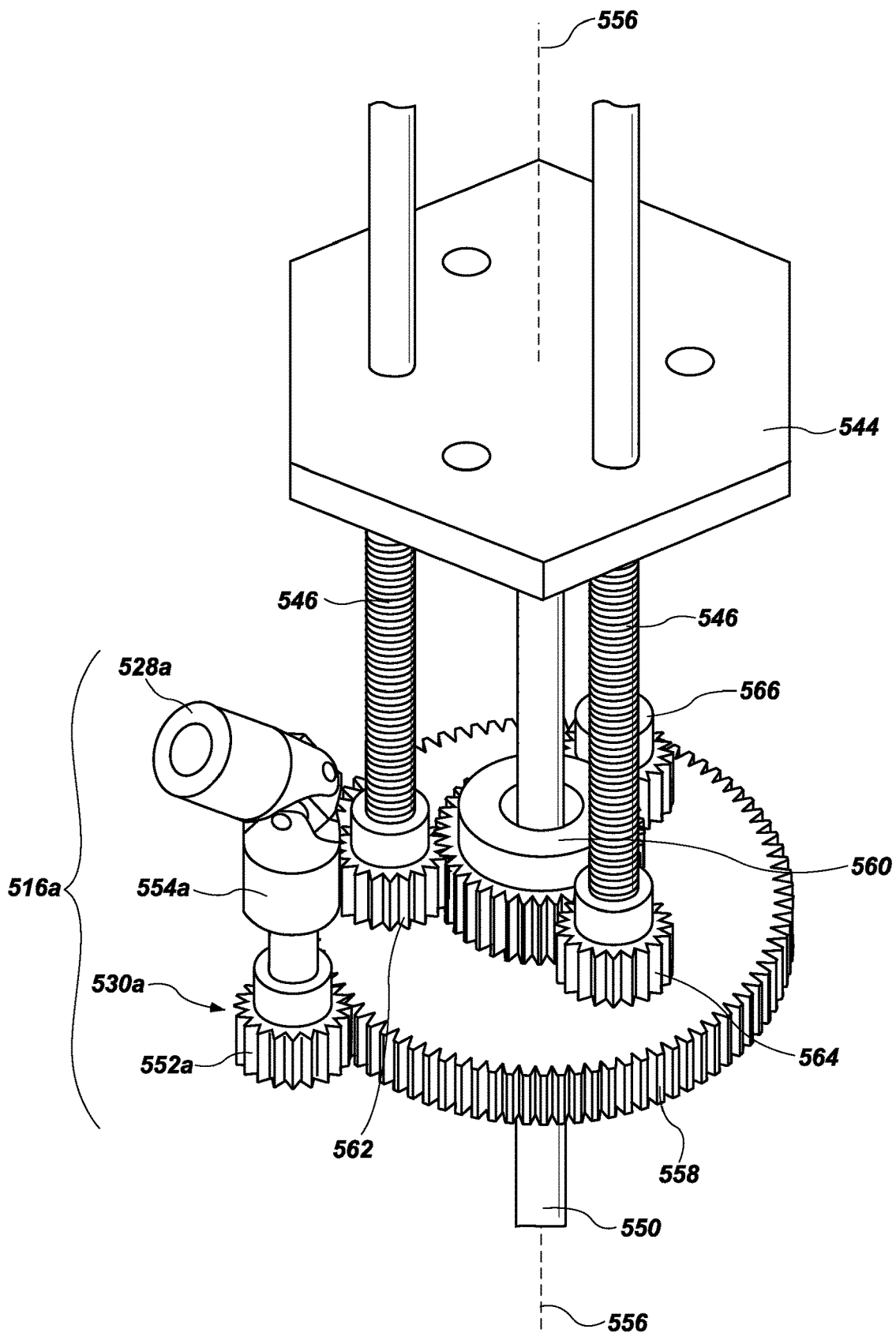

In some embodiments, a receiving-engagement member 532a associated with a first DOF assembly 516a may include a primary gear 558, a secondary gear 560, which may be fixed to the primary gear 558, and three receiving gears 562, 564, 566 (FIG. 5E). The primary gear 558 may be engaged with the gear 552a of the first DOF assembly 516a and may be rotated by the gear 552a of the first DOF assembly 516a. In some embodiments, the primary gear 558 may be centered about the center longitudinal axis 556 of the probe assembly 540 and may have a center aperture through which the probe 550 may extend. The secondary gear 560 is coupled to an upper surface of the primary gear 558 and is rotatable about the same axis as the primary gear 558. Because the secondary gear 560 is fixed to the primary gear 558, the secondary gear 560 rotates at a same rate as the primary gear 558. Each of the three receiving gears 562, 564, 566 is coupled to a longitudinal end of a respective drive rod 546 of the plurality of drive rods 546 such that rotation of a receiving gear (e.g., receiving gear 562) causes the rotation of a drive rod 546 to which it is coupled. The three receiving gears 562, 564, 566 may be engaged with the secondary gear 560 such that rotation of the secondary gear 560 causes rotation of each receiving gear of the three receiving gears 562, 564, 566, and as a result, rotation of the plurality of drive rods 546, translation of the translating plate 544, and translation of the probe 550. Accordingly, the first DOF assembly 516a may impart a degree of freedom (e.g., a translational degree of freedom) to the probe 550.

Figure 5F:
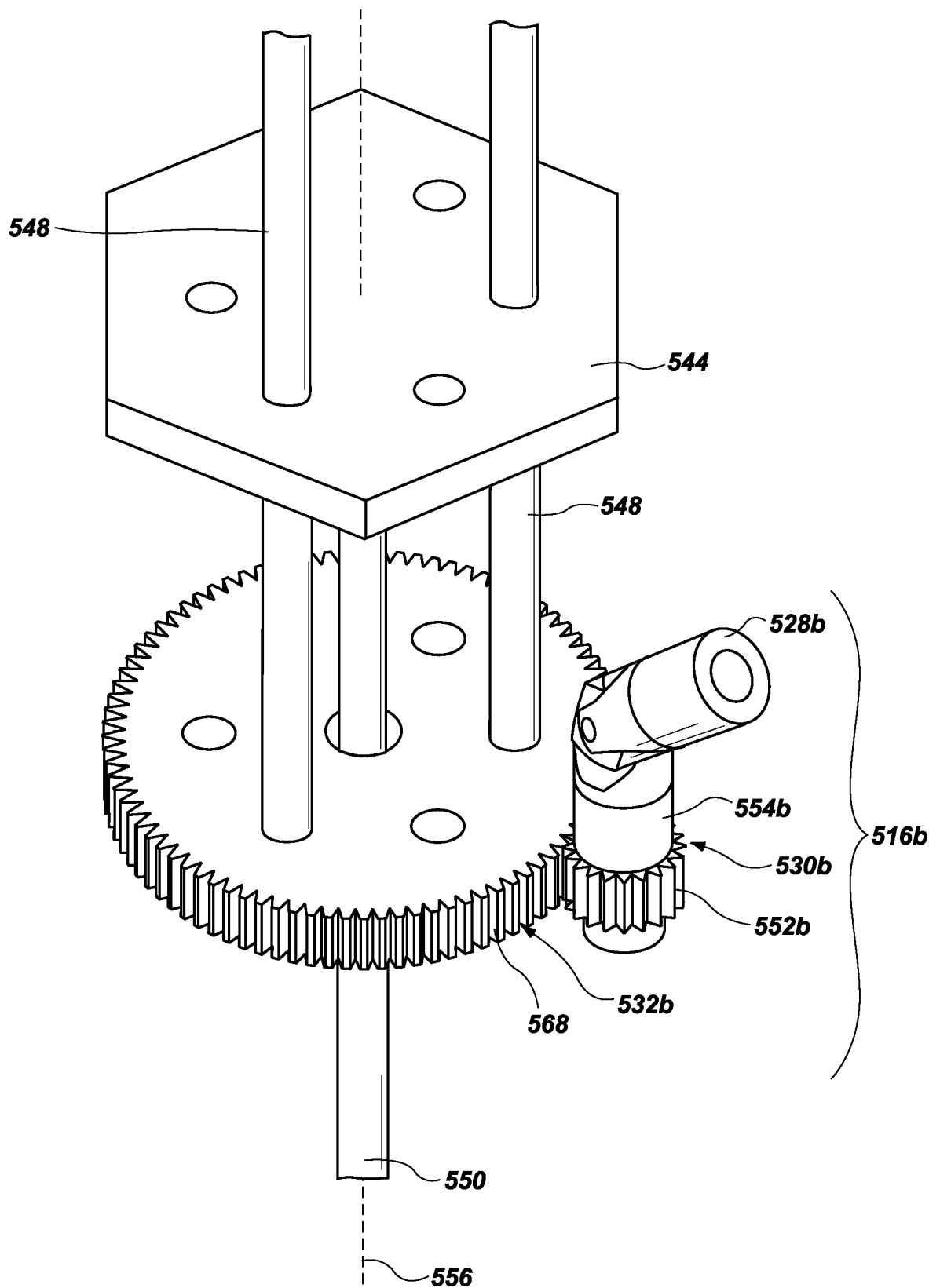

In one or more embodiments, a receiving-engagement member 532b associated with a second DOF assembly 516b may include a base gear 568 to which each of the plurality of structure rods 548 is secured (FIG. 5F). The base gear 568 may be engaged with the gear 552b of the second DOF assembly 516b and may be rotated by the gear 552b of the second DOF assembly 516b. The base gear 568 may be centered about the center longitudinal axis 556 of the probe assembly 540 and may include a center aperture through which the probe 550 may extend. Furthermore, because the plurality of structure rods 548 are secured to the base gear 568, rotation of the base gear 568 may cause rotation of the entire probe assembly 540 and the probe 550 about the center longitudinal axis 556 of the probe assembly 540. Accordingly, the second DOF assembly 516a may impart a degree of freedom to the probe 550.

Referring still to FIGS. 5A-5F together, in view of the foregoing, the first and second DOF assemblies 516a, 516b in conjunction with the probe assembly 540 may enable the probe 550 to be vertically translated and rotated about a vertical axis in addition to the degrees of freedom imparted by the linear delta system 500. As a result, the probe 550 may be quickly and efficiently oriented and translated for performing measurements and scanning procedures.

For example, the linear delta system 500 may be utilized to measure in-channel gaps of a fuel assembly having various plate array configurations defining parallel or concentric gaps between plates. As is known in the art, the gaps enable coolant of fuel and, when subjected to reactor conditions, the plates of the fuels assembly swell and the gaps shrink. As a result, measurements of the gaps are necessary for operation and testing. Accordingly, the probe 550 may include a channel gap probe having a long slender flat plate with two ultrasonic transducers at a longitudinal end of the plate. The transducers are mounted on spring elements that press the transducers against sides of the plates defining the gap. The transducers perform an ultrasonic pitch-catch action where the time-of-flight between the two transducers during this activity, when coupled with the speed of sound in water, indicates a distance between the sides of the plates defining the gaps. The probe 550 must be positioned directly over the gap and parallel or tangent to the gap and then translated down the entire gap length. Additionally, the linear delta system 500 may be utilized to orient alternate sensors in manners similar to the manner described above.

In view of the foregoing, the linear delta system 500 may provide advantages over conventional linear delta systems. For example, due to the added degrees of freedom, the linear delta system 500 may provide a quick and efficient system for inserting a probe 550 in channel gaps of a fuel assembly having various plate array configurations defining parallel or concentric gaps between plates. Accordingly, in comparison to conventional systems, the linear delta system 500 may be capable of probing more types of fuel assemblies having different and/or more complex channel geometries. Furthermore, the linear delta system 500 may be capable of probing damaged fuel assemblies of fuel assemblies not meeting predefined design tolerances.

Figure 6:
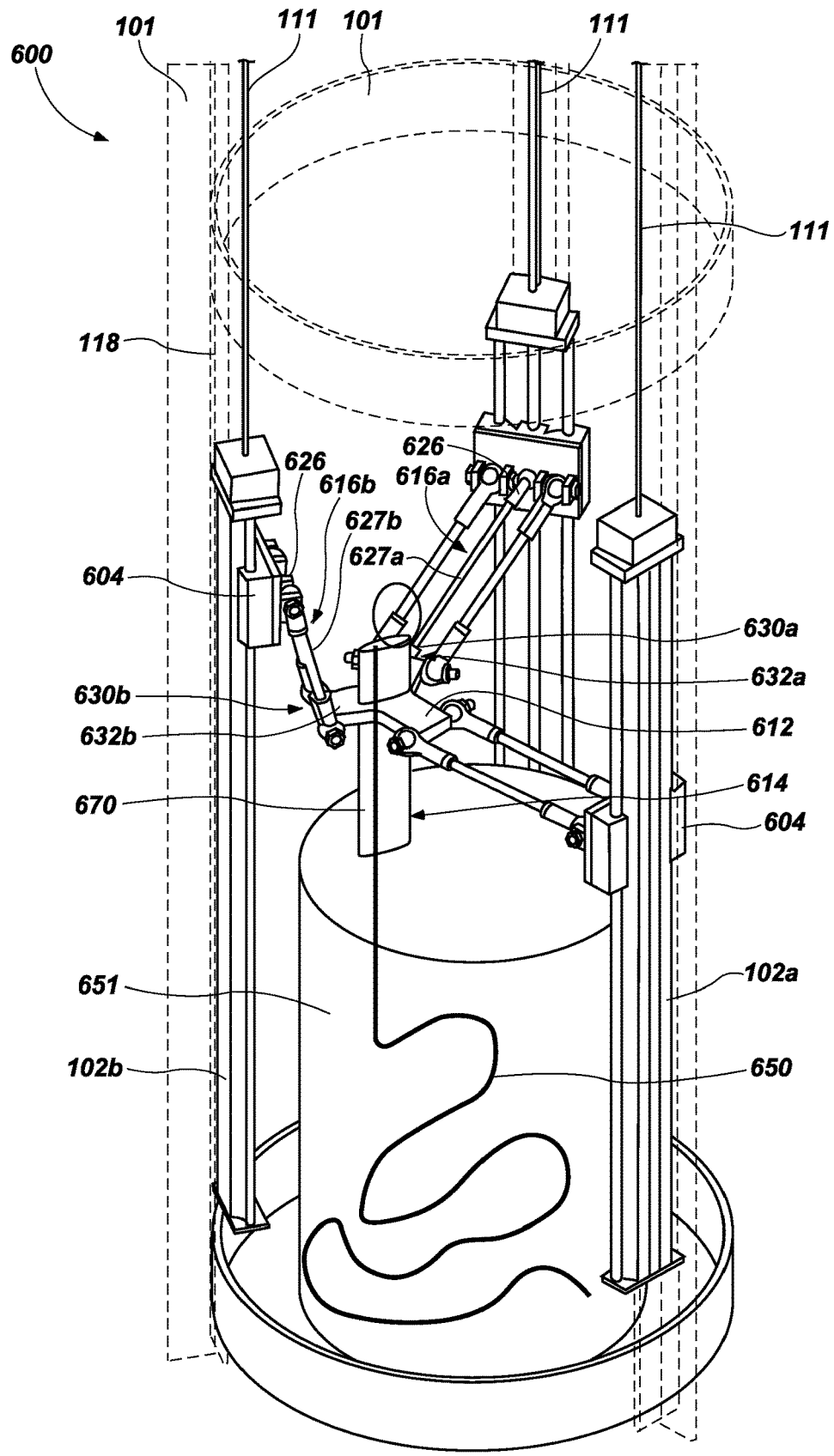
FIG. 6 is a perspective view of a linear delta system according to one or more embodiments of the present disclosure.

FIG. 6 shows a perspective view of a linear delta system 600 according to one or more embodiments of the present disclosure. As is described in further detail below, the linear delta system 600 may be utilized to embed fiber optics, cables, or equivalent form material within a granular medium 651 (e.g., sand, soil, gravel, wet concrete, etc.) using a probe system that vibrates, which causes liquefaction in the surrounding medium and reduces associated traversing resistance, enabling the probe to travel through the granular medium 651 and be deposited in the granular medium 651. In some embodiments, similar to the linear delta system 500 described above in regard to the FIGS. 5A-5F, the linear delta system 600 may include two DOF assemblies 616a, 616b implemented therein to add two additional degrees of freedom to an object 614 coupled to a platform 612. Furthermore, similar to the DOF assemblies 516a, 516b described above in regard to FIGS. 5A-5F, each of the DOF assemblies 616a, 616b includes a drive unit 121 (FIG. 1), a slidable-engagement member 122 (FIG. 1), a first receiving-engagement member 124 (FIG. 1), a first joint assembly 626, a rod 627a, 627b, a second joint assembly 628a, 628b, an imparting-engagement member 630a, 630b, and a second receiving-engagement member 632a, 632b.

Additionally, the linear delta system 600 may include a probe deposition system 670, and the probe deposition system 670 may be operated via any of the manners described above in regard to FIGS. 5A-5F and the probe 550. For instance, in some embodiments, the probe deposition system 670 may also include an upper plate, a translating plate, a plurality of drive rods, a plurality of structure rods, and a probe 650, and the probe deposition system 670 may be structured in the same manner as the probe assembly 540 described above in regard to FIGS. 5A-5F. In some embodiments, the probe 550 may include one or more fiber optic cables. Furthermore, the probe deposition system 670 may be operated via the same manners described above in regard to FIGS. 5A-5F.

In some embodiments, to facilitate deposition of the probe 650 within a granular medium 651, a controller 110 (FIG. 1) operably coupled to the linear delta system 600, the DOF assemblies 616a, 616b, and probe deposition system 670 may be configured to operate the linear delta system 600, the DOF assemblies 616a, 616b, and probe deposition system 670 such that the probe deposition system 670 is vibrated while depositing the probe 650. The vibration facilitates movement through the granular medium 651.

Figure 7:
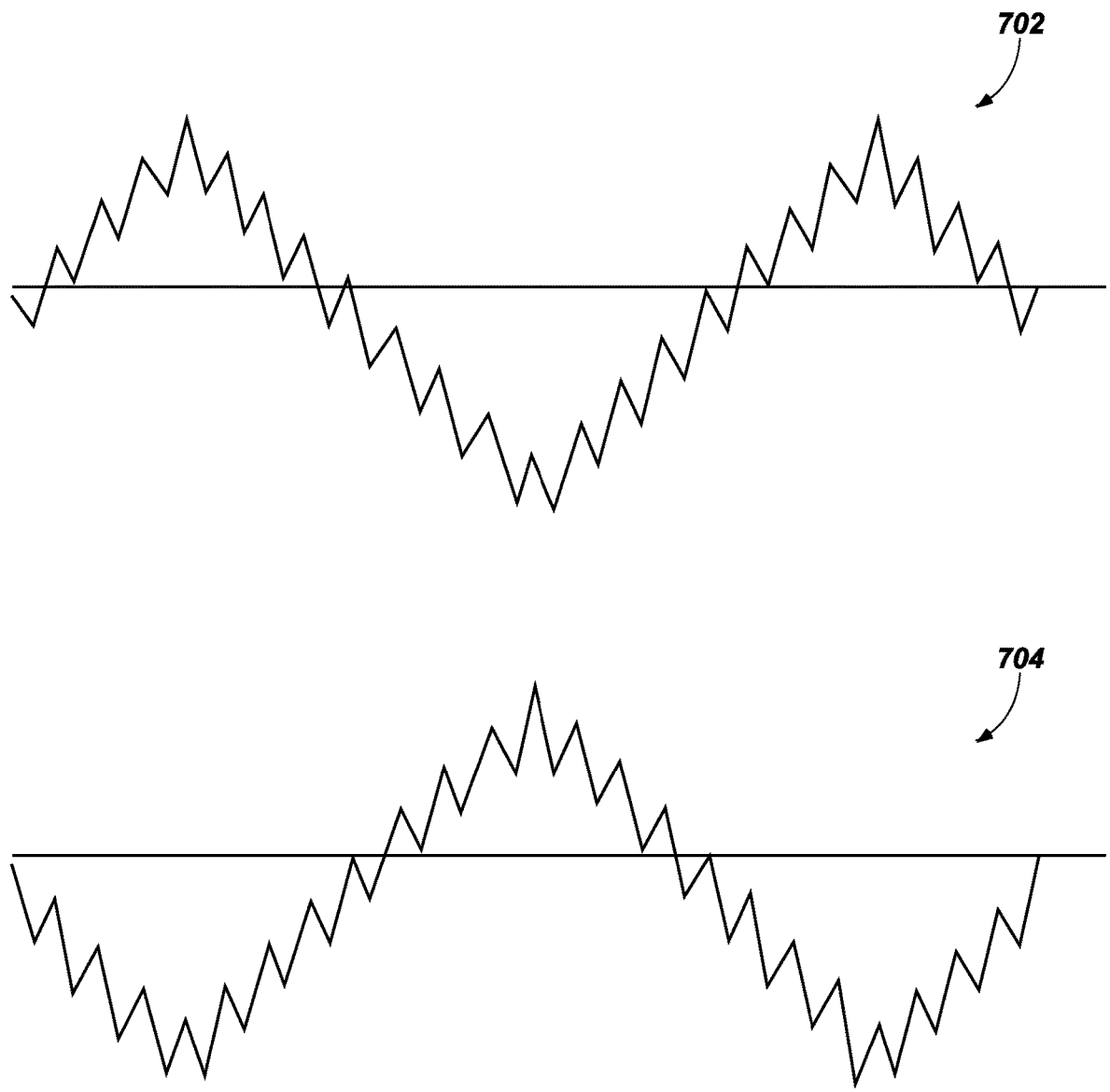
FIG. 7 shows a schematic representation of wave forms that may be experienced by portions of the linear delta system according to one or more embodiments of the present disclosure.

In one or more embodiments, during operation, the controller 110 (FIG. 1) may be configured to move linear delta system 600 in an overall triangle wave motion or sinusoidal wave motion (intended to be vertical displacement) and to move the probe deposition system 670 vertically in a counter (e.g., opposite) triangle wave motion or a counter sinusoidal wave motion. The foregoing results in a zero net global motion of the probe deposition system 670 and enables the linear actuator 604 to distribute vibration loads along longitudinal lengths of the linear delta system's lead screws (as discussed in further detail below). Simultaneously, the controller 110 (FIG. 1) may be configured to add smaller-amplitude-higher-frequency triangle wave motion or sinusoidal wave motion in comparison to the above-described motions (i.e., waveforms) to one or both the DOF assemblies 616a, 616b and moving the probe deposition system 670 and/or the entire linear delta system 600 in the smaller-amplitude-higher-frequency triangle wave motion or sinusoidal wave motion. FIG. 7 shows a schematic representation of a waveform 702 that may be experienced by the DOF assemblies 616a, 616b and a waveform 704 that may be experienced by the probe deposition system 670. Referring to FIGS. 6 and 7, combining waveform 702 and waveform 704 together, the resulting motion of the probe deposition system 670 relative to the granular medium 651 merely equates to the combination of the smaller-amplitude-higher-frequency waveforms.

Having the DOF assemblies 616a, 616b and the probe deposition system 670 experience opposite wave motions relative to each other enables the linear delta system 600 to distribute vibration loads across a longitudinal length (e.g., several threads) of the lead screws of the drive units 108a, 108b, 108c (FIG. 1) instead a single longitudinal location. This may reduce wear of the lead screws, and when ball screws are employed, the foregoing may reduce pitting at ball to screw interfaces (e.g., an interface between the linear actuators 604 and the screws). By reducing wear, the linear delta system 600 may enable the linear delta system 600 to experience higher vibration loads in comparison to conventional linear delta systems and may be utilized in wide variety of granular mediums in comparison to conventional linear delta systems. Furthermore, by reducing wear, the linear delta system 600 may experience longer life cycles in comparison to conventional linear delta systems and may lead to cost savings.

Furthermore, by distributing vibration loads across a longitudinal length of the lead screws, the linear delta system 600 of the present disclosure may provide a rapid prototyping system with deposition materials that demonstrate beneficial responses (e.g., better adhesion, relatively easier extrusion, etc.) when subject to vibration. Moreover, the linear delta system 600 may provide advantages in general vibration testing of components under simple or complex operational vibration loads or seismic loads. Likewise, the linear delta system 600 may have operational advantages that include precisely embedding fiber, string, or corded materials in granular mediums.

Figure 8:
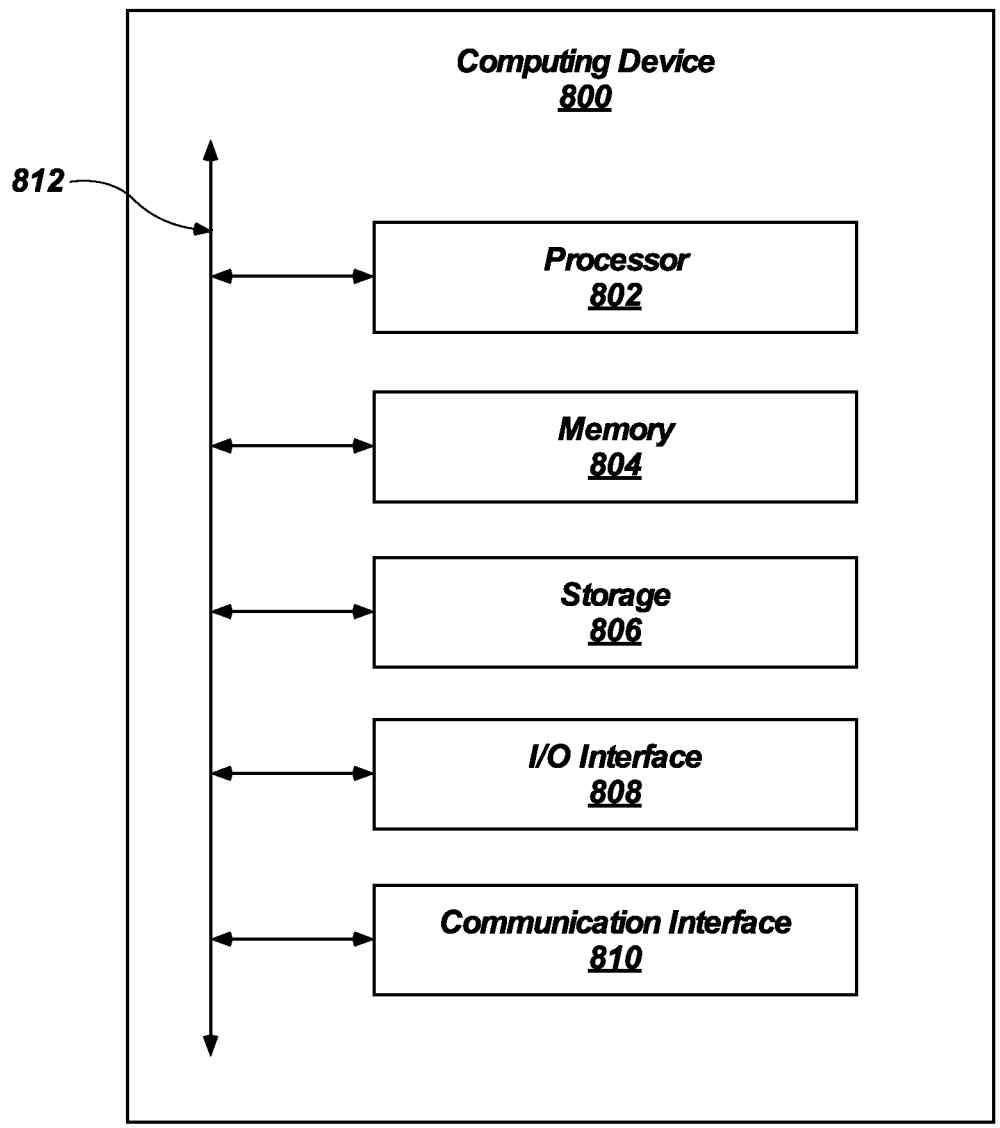
FIG. 8 is schematic diagram of a controller of a linear delta system according to one or more embodiments of the present disclosure.

FIG. 8 is a block diagram of a controller 110 according to one or more embodiments of the present disclosure. As shown in FIG. 8, in some embodiments, the controller 110 may include the linear delta operating system 800. One will appreciate that one or more computing devices may implement the linear delta operating system 800. The linear delta operating system 800 can comprise a processor 802, a memory 804, a storage device 806, an I/O interface 808, and a communication interface 810, which may be communicatively coupled by way of a communication infrastructure. While an exemplary computing device is shown in FIG. 8, the components illustrated in FIG. 8 are not intended to be limiting. Additional or alternative components may be used in other embodiments. Furthermore, in certain embodiments, the linear delta operating system 800 can include fewer components than those shown in FIG. 8. Components of the linear delta operating system 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers ("TLBs"). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive ("HDD"), a floppy disk drive, flash memory, an optical disc, a magneto-optical disc, magnetic tape, or a Universal Serial Bus ("USB") drive or a combination of two or more of these. The storage device 806 may include removable or non-removable (or fixed) media, where appropriate. The storage device 806 may be internal or external to the linear delta operating system 800. In one or more embodiments, the storage device 806 is non-volatile, solid-state memory. In other embodiments, the storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from linear delta operating system 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the linear delta operating system 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the linear delta operating system 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and legal equivalents.

What is claimed is:

1. A linear delta system, comprising:
    a frame;
    rails secured to the frame;
    linear actuators, each linear actuator coupled to a respective rail and configured to translate along a longitudinal length thereof;
    pairs of parallel rods each operably coupled to a respective linear actuator;
    a platform coupled to a longitudinal end of each of the pairs of parallel rods opposite the respective linear actuator;
    an object movably coupled to the platform; and
    at least one degree of freedom imparting assembly, comprising:
        a profiled rod extending in a direction parallel to the rails;
        a drive unit configured to rotate the profiled rod and disposed on the frame of the linear delta system, wherein the at least one degree of freedom imparting assembly is configured to impart a degree of freedom to the object;
        a slidable-engagement member coupled to the profiled rod and slidable along a longitudinal length of the profiled rod;
        a first receiving-engagement member operably engaged with the slidable-engagement member;
        a first joint assembly connected to the first receiving-engagement member;
        a rod secured to the first receiving-engagement member on a first longitudinal end thereof and secured to a second joint assembly on a second opposite longitudinal end thereof;
        an imparting-engagement member connected to the second joint assembly; and
        a second receiving-engagement member operably engaged with the imparting-engagement member and the object movably coupled to the platform.

2. The linear delta system of claim 1, wherein the slidable-engagement member comprises a beveled gear having a central aperture extending therethrough, wherein the profiled rod extends through the central aperture.

3. The linear delta system of claim 1, wherein each of the slidable-engagement member, the first receiving-engagement member, the imparting-engagement member, and the second receiving-engagement member comprises a beveled gear portion.

4. The linear delta system of claim 1, wherein each of the first joint assembly and the second joint assembly comprises a universal joint.

5. The linear delta system of claim 1, wherein each pair of the pairs of parallel rods is connected to a respective linear actuator via spherical or universal joints.

6. The linear delta system of claim 5, wherein the first joint assembly of the at least one degree of freedom imparting assembly shares a common horizontal axis with the spherical or universal joints of a respective pair of parallel rods connecting the pair of parallel rods to a respective linear actuator.

7. The linear delta system of claim 1, wherein the first receiving-engagement member is at least partially disposed within a respective linear actuator, and wherein the rod of the at least one degree of freedom imparting assembly is parallel to and extends between a respective pair of parallel rods.

8. The linear delta system of claim 1, wherein the at least one degree of freedom imparting assembly comprises a plurality of degree of freedom imparting assemblies, each rail having at least one respective degree of freedom imparting assembly.

9. A linear delta system, comprising:
    linear actuators, each linear actuator coupled to and configured to translate along a longitudinal length of a respective rail;
    a platform;
    pairs of parallel rods extending between and each pair operably coupled to a respective linear actuator and the platform; and
    at least one degree of freedom imparting assembly, comprising:
        a profiled rod extending in a direction parallel to the rails;

a drive unit configured to rotate the profiled rod, wherein the at least one degree of freedom imparting assembly is configured to impart a degree of freedom to an object;

a slidable-engagement member coupled to the profiled rod and slidable along a longitudinal length of the profiled rod;

a first receiving-engagement member operably engaged with the slidable-engagement member;

a first joint assembly connected to the first receiving-engagement member;

a rod secured to the first receiving-engagement member on a first longitudinal end thereof and secured to a second joint assembly on a second opposite longitudinal end thereof;

an imparting-engagement member connected to the second joint assembly; and a second receiving-engagement member operably engaged with the imparting-engagement member and the object movably coupled to the platform.

10. A linear delta system, comprising:

a platform;

pairs of parallel rods, each pair operably coupled to a respective side of the platform; and at least one degree of freedom imparting assembly, comprising:

a profiled rod extending in a direction parallel to rails;

a drive unit configured to rotate the profiled rod, wherein the at least one degree of freedom imparting assembly is configured to impart a degree of freedom to an object;

a slidable-engagement member coupled to the profiled rod and slidable along a longitudinal length of the profiled rod;

a first receiving-engagement member operably engaged with the slidable-engagement member;

a first joint assembly connected to the first receiving-engagement member;

a rod secured to the first receiving-engagement member on a first longitudinal end thereof and secured to a second joint assembly on a second opposite longitudinal end thereof;

an imparting-engagement member connected to the second joint assembly; and a second receiving-engagement member operably engaged with the imparting-engagement member and the object movably coupled to the platform.

\* \* \* \* \*